Aug. 23, 1955 P. W. JACOBSEN 2,715,861
PLATEN TAPE APPLYING
Filed Nov. 27, 1953 2 Sheets-Sheet 1
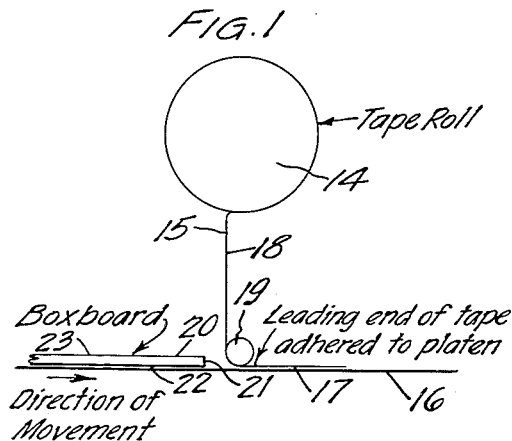
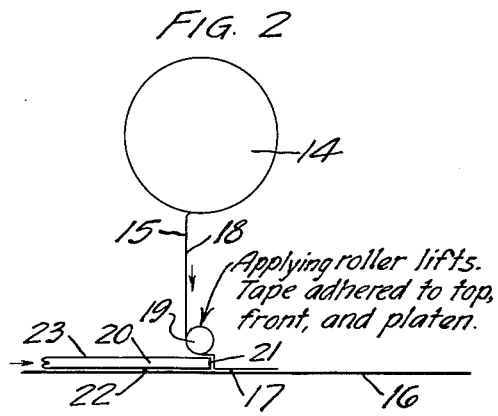
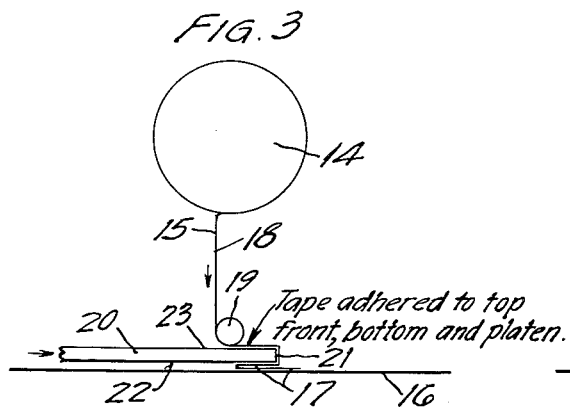
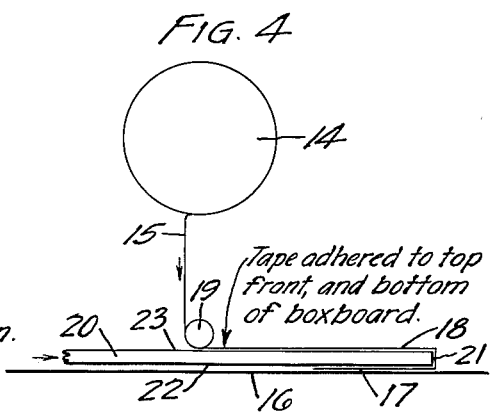
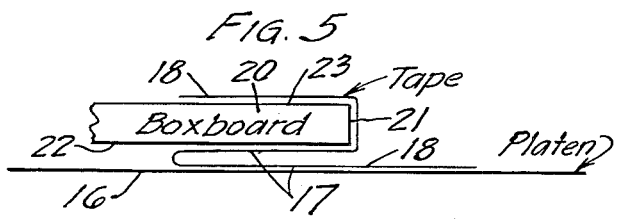
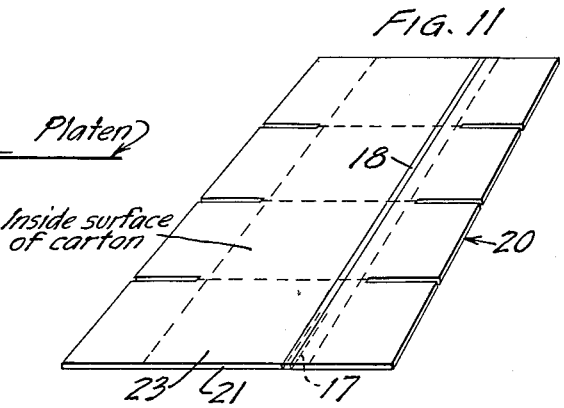
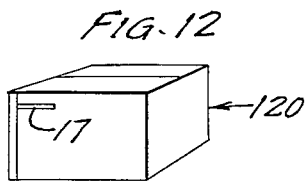
INVENTOR
PAUL W. JACOBSEN
BY
ATTORNEYS

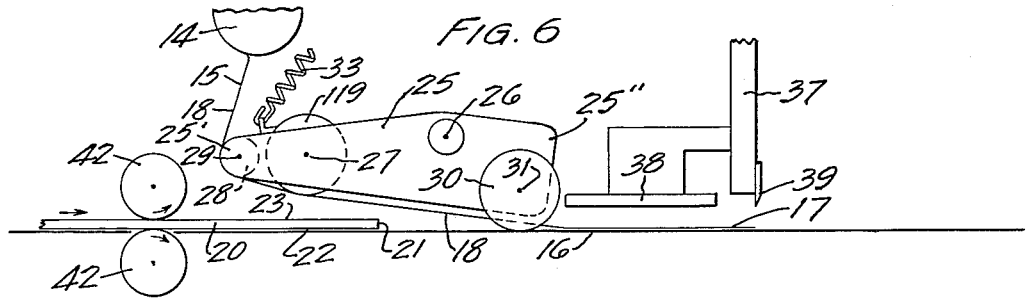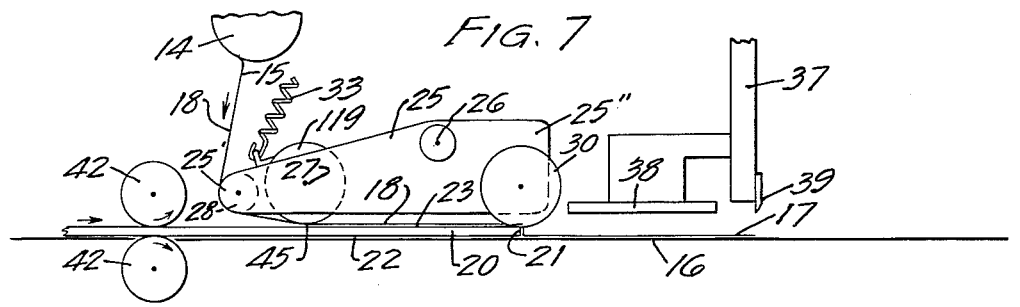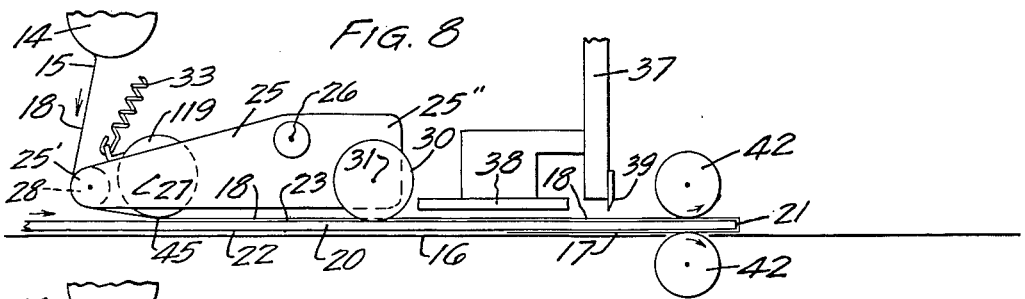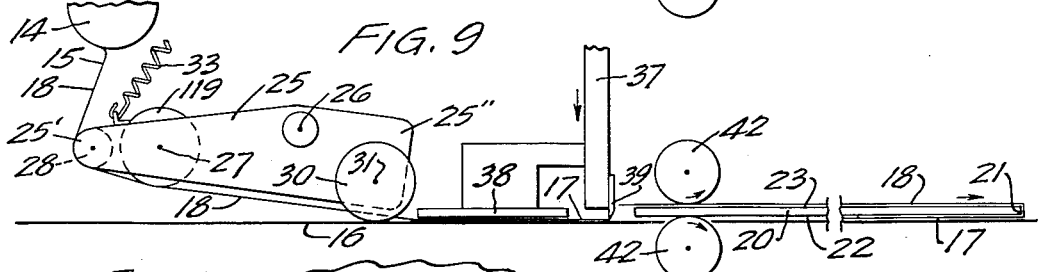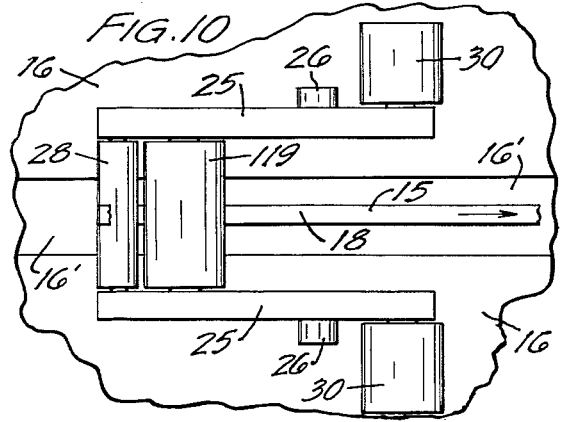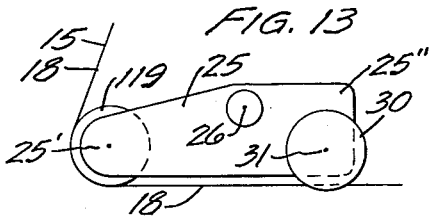

United States Patent Office 2,715,861
Patented Aug. 23, 1955

2,715,861

PLATEN TAPE APPLYING

Paul W. Jacobsen, Kiel, Wis., assignor to Minnesota Mining & Manufacturing Company, St. Paul, Minn., a corporation of Delaware Application November 27, 1953, Serial No. 394,767

6 Claims. (Cl. 93—1)

This invention relates to the application of adhesive tape to objects or articles, particularly the application of normally tacky, pressure-sensitive adhesive tape to three successive surfaces of an article.

A specific objective is to provide improvements in the application of a continuous strip of normally tacky, pressure-sensitive adhesive tape having great tensile strength to a carton blank stamped from a piece of boxboard, the tape to extend along one of the two broad surfaces, around an adjoining end surface and thence along the second broad surface, the tape to serve as a "tear strip" after the blank has been formed into a carton, for opening the carton.

Certain machines that have been designed for this purpose are primarily characterized by an initial temporary attachment of a portion of the tape to a platen, from whence it is then transferred to the article, and they are accordingly sometimes referred to as the "platen type" of tape applying machines. Such a machine is broadly described and claimed in the copending application of Walter S. Aldrich and Robert H. Hanes which was filed February 18, 1952 as Serial No. 272,086.

Such machines usually employ a buffing or applying roller for applying the tape, and although efficient at ordinary speeds, the leading edges of the carton blanks are sometimes bruised to the point of damage when they strike the roller if the speed at which the blanks are fed through the machine is substantially increased.

A further and more specific objective therefore, is to provide an applying roller means in the platen type of tape applying machines that will contribute substantially to a reduction of harmful bruising of the leading edges of articles in high speed taping.

The present invention meets these and other objectives by certain new improvements in the prior platen tape applying techniques. The invention provides a new applying roller assembly which, together with the manner of its operation, exemplifies the said improvements. An illustrative embodiment of the assembly is described below and shown in the accompanying drawings.

Figures 1 to 5 are diagrams showing the basic platen tape applying principle;

Figures 6 to 9 are diagrams of a machine employing the new applying roller assembly;

Figure 10 shows a plan view of the applying roller assembly;

Figure 11 shows a carton blank to which a tear strip has been applied by the machine of Figures 6 to 10;

Figure 12 shows a carton made from the blank of Figure 11; and

Figure 13 shows an alternative form of the applying roller assembly.

Referring first to Figures 1 to 5, which show the basic platen tape applying principle broadly described and claimed in the said copending application Serial No. 272,086, a length of normally tacky, pressure-sensitive adhesive tape 15 is conducted from a source of supply 14 toward a platen 16, and a portion 17 of the said length is temporarily adhered thereto with the succeeding unadhered portion 18 extending outwardly from the platen. A movable applying roller 19 is in contact with the back of the unadhered portion 18 of the tape (Figure 1). A piece of boxboard 20 that is to be taped on three successive surfaces with a continuous strip, is advanced until its leading end surface 21 bears against the adhesive side of the unadhered portion 18 of the tape. The said motion or advancement of the article is continued, whereupon the roller 19 lifts (Figure 2) and the article thereafter passes between the roller 19 and the platen 16 (Figures 3 and 4). At the same time the roller is caused to bear towards the platen. The force of the moving article peels off the portion 17 of tape that was initially adhered to the platen and turns the tape back on itself (Figure 5). As the adhesive side of the portion 17 is thus progressively turned toward the article (the boxboard), it becomes adhered to the surface 22 thereof. The portion 18 becomes adhered to the opposite surface 23 and to the leading end surface 21.

Figure 5 is an enlarged view of the portion of Figure 3 that shows the advancing end portion of the boxboard. In this figure, as in Figures 1 to 4, it will be understood that the boxboard rests on the platen surface and that the tape is adhered to the boxboard and platen, respectively, notwithstanding the spaced relationship that appears in the diagrams; the spacing is an exaggeration to permit a distinct showing of the several separate elements, and is not actual.

It will be noted that the withdrawl of additional tape 15 from the direction of the supply or source 14 is shown as commencing as soon as the article 20 contacts the applying roller 19 (Figure 2); and that the force for such withdrawal is supplied by the movement of the article through the machine; also that the initiation or commencement of this movement of the tape would be relatively sudden, with a hard jerk, particularly if the article 20 is moving at high speed; and that the brunt of this burden is borne by the leading edge 21 of the article 20.

According to the present invention however, the applying roller is normally held at a sufficient distance above the platen to be out of contact with the article as the latter advances between the platen and the roller, and the roller is not let down into contact with the article until after the leading end of the article has passed a substantial distance beyond the roller. As a result the strain of the pull of the tape is distributed over a wider area of the article.

This will be more clearly brought out in the construction and operation of the apparatus of Figures 6 to 10.

Referring now to Figures 6 to 10, an elongate frame 25, aligned with the path of advancement of the carton blank 20, with its near end 25' extending toward the point from which the blank 20 is advanced, and its far end 25" extending toward the point toward which the article is advanced, is mounted at a point between its two ends 25' and 25" for pivotal movement about an axis 26 that is parallel with the platen and at right angles to the path of advancement of the blank 20.

An applying roller 119 is mounted at the near end 25' of the frame for rotation about an axis 27 that is parallel with the pivotal axis 26.

An idler roller 28 is mounted at the near end 25' of the frame between the applying roller 119 and the point from which the blank 20 is advanced, for rotation about an axis 29 that is parallel with the pivotal axis 26.

Two pilot rollers 30, one on either side of the frame 25, are mounted at the far end 25" of the frame for rotation about an axis 31 that is parallel with the pivotal axis 26.

A yieldable bias means in the form of a spring 33 that is attached to the near end 25' of the frame, impels the near end upwardly about the pivotal axis 26, thereby causing the far end 25" of the frame 25 normally to bear downwardly toward the platen 16 to bring the peripheries of the pilot rollers 30 in closer spaced relation to the platen than is the periphery of the applying roller 119. The frame 25 is then at rest, in normal position (Figures 6 and 9). The distance between the periphery of the applying roller 119 and the platen 16 is greater than the height of the blank 20.

The respective spaced relations of the applying roller 119, the pilot rollers 30 and the pivotal axis 26 of the frame 25, in respect to the platen 16, are such that the advancing blank 20 will hold the pilot rollers 30 upwardly away from the platen a distance sufficient to cause the applying roller 119 to bear downwardly (against the force of the spring bias 33) upon the top surface 23 of the blank 20 and thereby press and apply the tape 15 to the surface 23. The frame 25 is then in tape applying position (Figures 7 and 8). The idler roller 28 is positioned in the frame so that its periphery will not contact the surface 23 when the frame is in this applying position.

To the right of the applying roller assembly ("beyond" the said assembly, in terms of the travel of the work through the machine), is a buffing pad and cutter assembly 37 mounted for vertical reciprocation and impelled downwardly and upwardly by a spring means and a solenoid (not shown), and carrying a buffing pad 38 and a knife 39.

The portion of the working surface of the platen 16 adjacent the tape (beneath the tape in the illustrated machine) is slightly depressed in respect to the general level of the said working surface. As indicated in Figure 10, the depressed portion forms, in effect, a channel 16' that extends in alignment with the tape 15, wider than the tape but narrower than the length of the applying roller 119. The depth of the channel is somewhat greater than the thickness of the tape, and it extends to the right and left beyond the buffing pad 38 and the applying roller 119 in either direction, respectively. The buffing pad is narrower than the channel so that it may fit into the channel and press the tape against the depressed portion of the platen surface.

The carton blanks 20 are propelled or advanced through the machine from left to right by pairs of power driven propelling rollers 42.

In operation, a supply roll 14 of normally tacky pressure-sensitive adhesive tape 15 having great tensile strength, is mounted above the platen in such a position that the tape will be adhesive side out when led from the supply to and around the idler roller 28. From thence it is led to the right, adhesive side down, beneath the applying roller 119 and thence along the platen 16 beneath the raised buffing pad 38 until the leading end is directly beneath the knife 39. The leading portion 17 of the tape that extends from the left end of the buffing pad 38 to the knife 39 is then manually pressed down upon the depressed portion of the surface of the platen 16 to adhere it thereto. It may subsequently be peeled off without soiling the platen or harming the tape. The capacity of normally tacky pressure-sensitive adhesive tape for such performance is well known. It is due largely to the eucohesive quality of the adhesive employed, i. e., the adhesive is more cohesive than adhesive, but still tacky; also the adhesive has greater adherence to the tape backing than to a surface to which the tape is adhered. The leading portion 17 has thus been temporarily applied to the platen. The unapplied portion 18 of the tape extends upwardly from the platen to and around the applying roller 119, and thence toward the supply. (Figure 6.)

A carton blank 20 is then fed from the left to the propelling rollers 42 whereupon they advance it along the platen 16 in the direction of the arrow until the leading end of the blank strikes the pilot rollers 30, whereby the pilot rollers 30 are raised and with them the far end 25" of the applying roller frame 25, thus turning the frame counterclockwise about the pivotal axis 26 against the pull of the spring 33, and thereby causing the applying roller 119 at the near end 25' of the frame to move downwardly into contact with the top surface 23 of the blank 20 at the point 45 with the portion 18 of the tape 15 between the roller 119 and the surface 23. (Figure 7.)

The tape is thus applied, at this point in the progress of the blank 20 through the machine, to the leading edge surface 21 of the blank and thence along the top surface 23 of the blank to the applying roller point of contact 45. Since the application of this length of tape on the surfaces 21 and 23 is accomplished by the time the blank 20 commences to pull or withdraw fresh tape from the supply roll 14, the strain on the blank which is caused by the sudden commencement of the tape withdrawal is distributed over a portion of the blank that is relatively great in comparison to the portion that would thus be strained were the pull-off to commence when the tape is applied only to the leading surface 21 of the blank; and it is this feature that contributes in large measure to the capacity of the machine to attain the objective of reducing damage to the blanks in high speed taping. The applying roller 119 is located at a point removed from the leading portion 17 of tape and is normally in spaced relation to the platen 16 and it does not descend until a portion of the blank has passed under it, so that its first contact with the blank is made at a point (45) removed from the leading end 21 of the blank.

Continued advancement of the blank 20 peels off the portion 17 of tape that was initially applied to the platen 16 and turns the tape back on itself so that it becomes applied to the bottom of the blank (Figure 5), until all of the portion 17 has been transferred from the platen to the bottom of the blank (Figure 8). At the same time the portion 18 becomes adhered to the top of the blank, since the applying roller 119 continues to bear down on the blank as long as the pilot rollers 30 are held up by the blank.

After the trailing end of the blank has passed the pilot rollers, the spring 33 returns the applying roller frame 25 to its normal position with the applying roller 119 above the level of the top surface 23 of the blank 20 (Figure 9).

After the trailing end of the blank has passed the knife 39, the assembly 37 automatically moves down into operative position, whereby the knife 39 severs the tape and the buffing pad 38 presses downwardly upon the platen 16. The length of tape that was drawn out along the platen beneath the pad 38 by the movement of the carton blank 20 prior to the above described severance, is thus pressed by the downwardly moving pad to become the leading portion 17 of the next succeeding length temporarily applied to the platen (Figure 9).

The carton blank 20 that has been taped with a tear strip in the above described operation, is shown in Figure 11. Figure 12 shows a carton 120 made from the blank, the portion 17 of the tape being on the outside of the carton in position to be grasped and pulled when the carton is to be opened. The portion 18 extends around the inside surface of the carton. Pulling on the end 17 of the high tensile strength tape will operate, in a manner well known, to tear open the carton.

There are numerous alternatives, all within the scope of the invention described and/or claimed herein.

For example, the idler roller 28 may be dispensed with, as shown in Figure 13.

A single pilot roller 30 may be employed instead of the two shown, e. g., one of the two illustrated rollers 30 (Figure 10) may simply be taken off, or the two may be replaced by a single roller within the frame with a deep peripheral groove midway between the ends of the roller to accommodate the portion 18 of the tape 15.

The spring 33 may be replaced by other suitable means for imparting a yieldable clockwise bias to the applying roller frame 25, e. g., the far end 25" of the frame may be weighted.

The illustrated apparatus is shown as being positioned with the platen 16 horizontal. Obviously it may be in any position convenient to its use, and the terms "right," "left," "beneath," etc., are accordingly relative and not limiting.

The basic platen tape applying movement or principle, shown in Figures 1 to 5 and broadly described and claimed in the said copending application Serial No. 272,086, has utility in applying tape to three successive surfaces of an article (such as the surfaces 21, 22 and 23 of the article 20), to two successive surfaces (such as the surfaces 21 and 22) or to only one surface (such as the surface 22). The present invention provides an improvement in the said platen tape applying movement as utilized in the application of tape to three successive surfaces, the said improvement being primarily characterized by a postponement of the commencement of tape withdrawal until after a length of tape has been applied to the surface of the article opposite the platen. All embodiments and adaptations of the said improvement are contemplated as coming within the scope of the invention herein set forth.

I claim:

1. A method of applying a length of normally tacky, pressure-sensitive adhesive tape to three successive surfaces of an article comprising conducting a length of tape from a source toward a platen, temporarily applying a leading portion of the said length to the said platen with the succeeding unadhered portion extending outwardly from the platen, advancing the article along the platen in a direction to bring the leading end of the article against the adhesive side of the said succeeding portion of tape, initially pressing the said succeeding portion against the article at a point on the article removed from the leading end of the article to apply tape to the surface of the article opposite the platen, and continuing the said advancement and the said pressing to withdraw additional tape from the source and to apply tape to the surface of the article facing the platen and to the surface opposite thereto, the tape that is applied to the surface of the article facing the platen being the said leading portion that was temporarily adhered to the platen.

2. Apparatus for applying a length of tape to three successive surfaces of an article comprising a platen, means for removably applying to the platen a leading portion of a length of tape with the succeeding unapplied portion extending outwardly from the platen toward a source, a movable applying roller in contact with the back of the said succeeding portion of tape at a point removed from the said leading portion, the roller being normally in spaced relation to the platen, means for advancing the article along the platen between the roller and the platen in a direction to bring the leading end of the article against the adhesive side of the said succeeding portion of tape at a point between the roller and the said leading portion, and means for moving the roller toward the platen and causing it to bear against the article to press the succeeding portion against the article at a point on the article removed from the leading end of the article to apply tape to the surface of the article opposite the platen, the continued advancement of the article between the roller and the platen serving to withdraw additional tape from the source and to apply tape to the surface of the article facing the platen and to the surface opposite thereto, the tape that is applied to the surface of the article facing the platen being the said leading portion that was temporarily adhered to the platen.

3. In an apparatus according to claim 2, a movable assembly for holding the applying roller comprising an elongate frame aligned with the path of advancement of the article with its near end extending toward the point from which the article is advanced and its far end extending toward the point toward which the article is advanced, and mounted at a point between its said two ends for pivotal movement about an axis that is parallel with the platen and at right angles to the path of advancement of the article, the applying roller being mounted at the near end of the frame for rotation about an axis that is parallel with the pivotal axis of the frame, at least one pilot roller mounted at the far end of the frame for rotation about an axis that is parallel with the pivotal axis of the frame, and a yieldable bias means for causing the far end of the frame normally to bear toward the platen to bring the periphery of the pilot roller in closer spaced relation to the platen than is the periphery of the applying roller, the respective spaced relations of the applying roller, the pilot roller and the pivotal axis of the frame in respect to the platen being such that the advancing article will hold the pilot roller away from the platen a distance sufficient to cause the applying roller to bear upon the surface of the article that is opposite to the platen.

4. An apparatus according to claim 3 wherein the portion of the working surface of the platen adjacent the tape is slightly depressed.

5. An applying roller assembly according to claim 3 having an idler roller mounted at the near end of the frame between the applying roller and the point from which the article is advanced for rotation about an axis that is parallel with the pivotal axis of the frame.

6. An apparatus according to claim 5 wherein the portion of the working surface of the platen adjacent the tape is slightly depressed.

References Cited in the file of this patent

UNITED STATES PATENTS

| Number | Name | Date |
|---|---|---|
| 2,109,527 | Fenton | Mar. 1, 1938 |
| 2,324,745 | Weber | July 20, 1943 |
| 2,350,244 | Malhiot | May 30, 1944 |
| 2,388,770 | Stein | Nov. 13, 1945 |
| 2,401,298 | Fritzinger | June 4, 1946 |
| 2,591,559 | Krueger | Apr. 1, 1954 |